(12) United States Patent  
Sikorski

(10) Patent No.: US 6,325,451 B1  
(45) Date of Patent: Dec. 4, 2001

(54) FASTENING ARRANGEMENT OF A DOOR SILL ON THE FLOOR PANEL OF A MOTOR VEHICLE

(75) Inventor: Jörg Sikorski, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/482,950

(22) Filed: Jan. 14, 2000

(30) Foreign Application Priority Data

Jan. 14, 1999 (DE) ............................................... 199 01 070

(51) Int. Cl.[7] .................................................... B62D 27/00
(52) U.S. Cl. ...................... 296/204; 296/188; 296/198; 296/30; 296/209
(58) Field of Search .................................. 296/198, 209, 296/29, 30, 188, 203.03, 204

(56) References Cited

U.S. PATENT DOCUMENTS

| 369,927 | * | 9/1887 | Eddy ................................... 296/30 X |
| 2,188,267 | * | 1/1940 | Ledwinka et al. .................... 296/204 |
| 3,528,699 | * | 9/1970 | Wessells, III ........................ 296/209 |
| 3,940,176 | | 2/1976 | Ito et al. . | |
| 5,577,797 | * | 11/1996 | Takanishi ........................ 296/203.03 |
| 5,782,525 | * | 7/1998 | Honma et al. ........................ 296/188 |

FOREIGN PATENT DOCUMENTS

| 4 008 703 | | 9/1991 | (DE) . |
| 40 20 363 | | 1/1992 | (DE) . |
| 196 00 460 | | 7/1997 | (DE) . |
| 0199744 | * | 10/1985 | (JP) ..................................... 296/204 |
| 3-109177 | | 5/1991 | (JP) . |
| 4-238784 | | 8/1992 | (JP) . |
| 5-131955 | | 5/1993 | (JP) . |

* cited by examiner

*Primary Examiner*—Dennis H. Pedder  
(74) *Attorney, Agent, or Firm*—Crowell & Moring LLP

(57) ABSTRACT

A fastening arrangement of a door sill on the floor panel of a motor vehicle provides a welded connection between a welding flange on a longitudinal side of the door sill and an edge zone of the floor panel extending laterally next thereto. The welded connection, being distributed along the length of the door sill, has at least one run of spot welds. The butt joint between the welding flange of the door sill and the opposite edge zone of the floor panel is bridged in the rearward length area by a tension member or lug extending transversely thereto. The tension member is fastened by one end on the door sill and by of the other end on the adjacent area of the floor panel.

10 Claims, 3 Drawing Sheets

FASTENING ARRANGEMENT OF A DOOR SILL ON THE FLOOR PANEL OF A MOTOR VEHICLE

This application claims priority of DE 199 01 070.6-21, filed Jan. 14, 1999, the disclosure of which is expressly incorporated by reference herein.

BACKGROUND OF THE INVENTION

The present invention relates to a fastening arrangement of a door sill on the floor panel of a motor vehicle, and more particularly, to an arrangement with a welded connection provided between a welding flange on a longitudinal side of the door sill and an edge zone of the floor panel extending laterally next to it, which welded connection being distributed along the length of the door sill, comprises at least one run of spot welds.

In such a fastening arrangement which is used in series produced motor vehicles, the door sill is conventionally fixedly connected by a welded connection along its longitudinal direction with an edge zone adjoining the door sill. For this purpose, the door sill has a welding flange on its longitudinal side. The welding flange is welded to the edge zone of the floor panel by at least one run of spot welds distributed over the entire length of the door sill. This results in a relatively low-cost welded connection between the door sill and the floor panel which can easily be made by automatic welding machines.

Particularly in the case of an offset frontal crash with a small width overlap of the motor vehicle with another vehicle or other obstacle, however, in fastening arrangements of this type, the spot-welded connection can fail because of occurring forces. The problem generally exists in such an offset frontal crash that, as the result of the accident forces acting in the front in the area of a forward wheel house, the motor vehicle is acted upon by a torsional force about a vertical axis of the vehicle. As a result, very high superimposed forces act between the door sill arranged on the side of the impact and the floor panel connected therewith, because the door sill arranged on the side of the impact is very decelerated in its movement within a short time, while, in contrast, the floor panel is acted upon by a torsional force about the above-described vertical axis of the vehicle. The spot-welded connection, which connects the door sill with the floor panel, is therefore stressed excessively particularly by tension forces, whereby the run of spot welds rips open, starting from the rearward end of the welded connection, in the direction toward the front, and the floor panel detaches from the door sill.

A bearing structure for a motor vehicle is shown in DE 40 08 703 A1 which has a relatively stiff supporting member and an adjoining thin-walled metal sheet. There, the supporting member has a so-called welding flange by way of which it is connected with the metal sheet. In order to prevent a destruction of the connection between the supporting member and the metal sheet in the event of impact-caused tension peaks, for example, in the event of a side impact, and in order to permit a uniform and large-surface introduction of force into the metal sheet, one or several projections are molded to the welding flange. The projections are connected with the metal sheet by welding. These measures are, however, not provided and suitable for avoiding particularly a tearing-off of the floor panel from the door sill. In addition, the construction of the welding flange with projections requires very high manufacturing expenditures.

SUMMARY OF THE INVENTION

An object of the present invention is to provide a fastening arrangement which has a better crash behavior in the event of an offset frontal crash with a small width overlap of the motor vehicle with another vehicle or another obstacle, which, in addition can be manufactured in a simple manner and at reasonable cost.

According to the invention, this object has been achieved by a fastening arrangement in which the butt joint between the welding flange of the door sill and the opposite edge zone of the floor panel is bridged in the rearward length area by a tension member (lug) extending transversely thereto, the tension member being fastened by means of one end on the door sill and, by means of the other end, on the adjacent area of the floor panel.

In the fastening arrangement according to the present invention, the butt joint between the welding flange of the door sill and the opposite edge zone of the floor panel is bridged in its rearward length area such by a tension member extending transversely thereto that the forces which occur particularly in the event of an offset frontal impact with a small width overlap of the involved motor vehicles can be absorbed particularly effectively between the door sill arranged on the side of the impact and the floor panel connected with the door sill. The spot-welded connection, which connects the door sill with the floor panel, is therefore relieved. An unbuttoning of the run of weld spots starting from the rearward end of the welded connection in the area of the rearward weld house in the direction toward the front and a tearing-off of the floor panel from the door sill is effectively avoided. Because the tension member must only be arranged in the rearward length area of the butt joint in order to avoid the unbuttoning, the fastening arrangement can be produced in a relatively simple manner and at correspondingly reasonable cost.

Thus, a run of weld spots along a butt joint extending essentially in the vertical direction of the vehicle is particularly easily accessible and producible for an automatic welding machine.

It was also found to be advantageous to fix both ends of the tension member by spot-welded connections which can be made particularly rapidly and easily when manufacturing the motor vehicle.

A tension member, can be is constructed as a separate angle piece with a first leg and another leg and can be manufactured in a simple manner and at reasonable cost. The two legs can, for example, be formed to rest on the door sill and the floor panel without high expenditures and can be connected therewith by a welded connection. The legs preferably enclose an obtuse angle of approximately 100–150°, whereby the transmission of high tension forces can be ensured in a crash.

If the two legs each rest by a broad side on a side of the welded flange facing away from the butt joint or in the area of a rearward wheel house on the adjacent area of the floor panel, a particularly tension-proof connection can also be established between the tension member and the welded flange or the floor panel.

In particular, an approximately horizontally extending first leg has been found to be advantageous because it can be fixed in a simple manner on the welding flange by way of a spot-welded connection existing anyhow. In order to permit a particularly good fastening of the tension member within the wheel house, the additional leg extends, starting from the first leg, preferably diagonally upwards.

If the tension member is fastened in the area of the rearward wheel house on a wheel house panel connected with the floor panel, the additional leg can be arranged in a simple manner at a variable height on the wheel house panel.

The tension member is particularly well protected from environmental influences between a wheel house panel situated on the inside and a wheel house panel situated on the outside, the fastening of the tension member is, in addition, suitable for absorbing particularly high tension forces.

Finally, the tension member is fixed on the welded flange and on the edge zone of the floor panel by one rivet per leg respectively. In this case, particularly the rivet arranged between the first leg and the door sill or the floor panel counteracts an unbuttoning of the run of weld spots.

The tension member can be formed as a separate angle piece having a first leg and a second leg, which legs enclose an obtuse angle ($\alpha$) of between approximately 100 to 150 degrees.

BRIEF DESCRIPTION OF THE DRAWINGS

Other objects, advantages and novel features of the present invention will become apparent from the following detailed description of the invention when considered in conjunction with the accompanying drawings.

FIG. 5b is a perspective view of the tension member or lug shown in FIG. 5a.

DETAILED DESCRIPTION OF THE DRAWINGS

Figure 1:
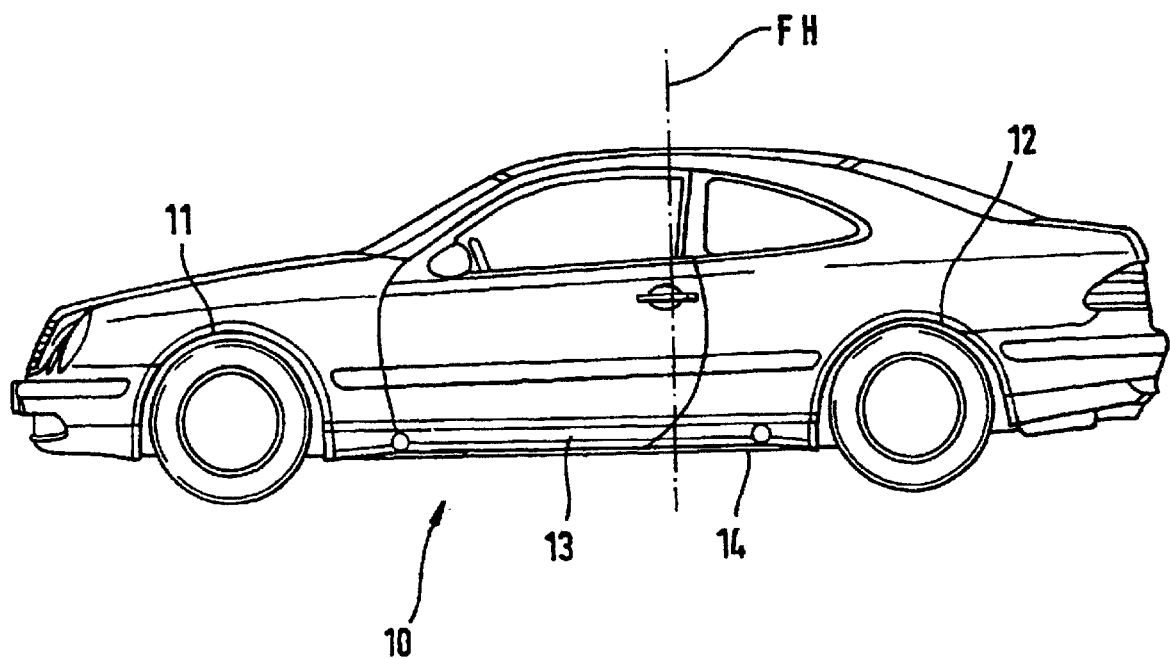
FIG. 1 is a lateral view of a motor vehicle having a fastening arrangement of a door sill on a floor panel according to the present invention.

FIG. 1 is a side view of a motor vehicle with a right door sill 10 which extends in the longitudinal direction of the vehicle between a forward and a rearward wheel house 11, 12 and is covered here by a door sill cover 13. The door sill 11 is connected by a fastening arrangement along its approximately entire length with a floor panel 14 by a welded connection. The fastening arrangement of the door sill 10 on the floor panel 14 is, of course, mirror-symmetrically provided with respect to a longitudinal center plane on both sides on the motor vehicle.

In FIG. 1, FH indicates a vertical axis of the vehicle about which, in a frontal crash with a small width overlap of the involved motor vehicles, the motor vehicle is torqued by a force which occurs, for example, in the forward right frontal area.

Figure 2:
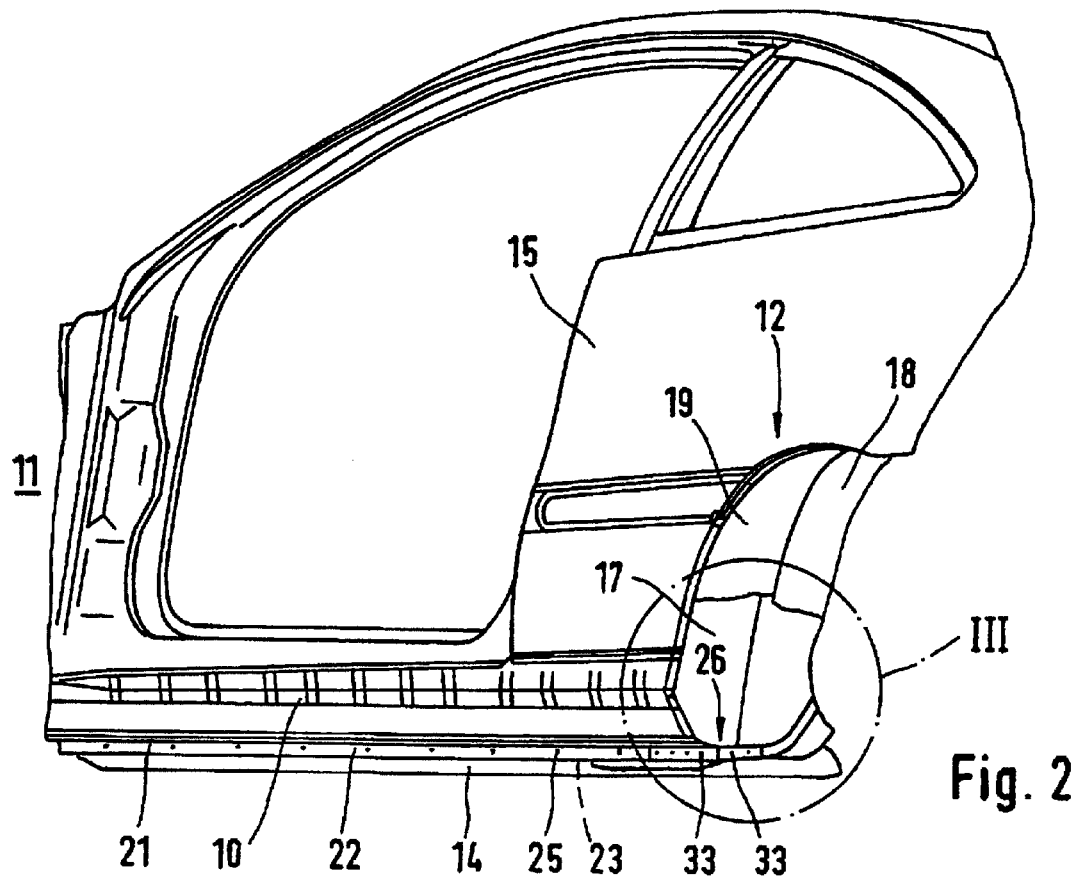
FIG. 2 is a cutaway perspective side view of the fastening arrangement according to FIG. 1.
Figure 3:
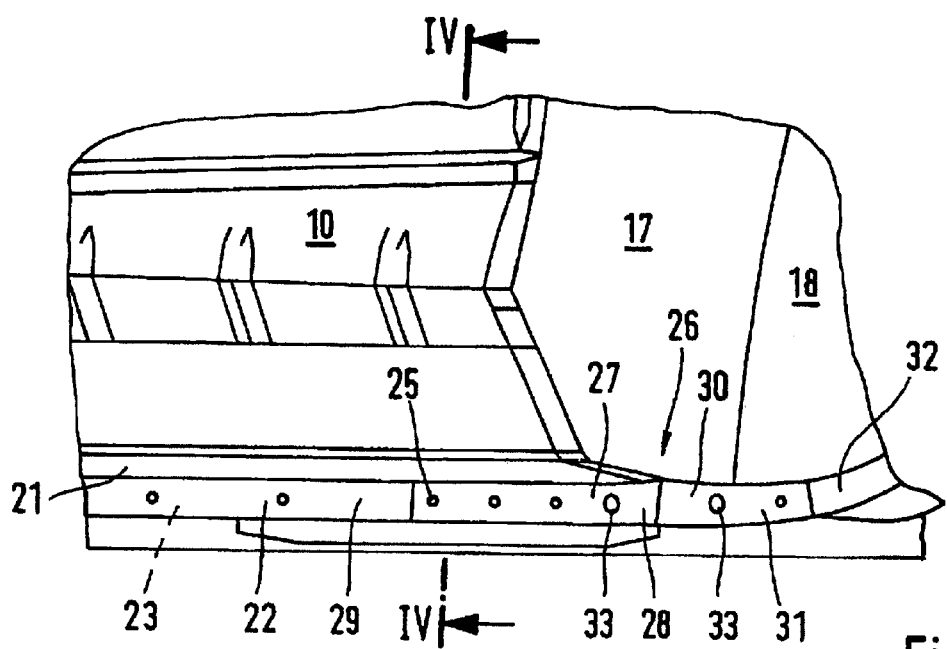
FIG. 3 is an enlarged view of the fastening arrangement of the invention according to the detail III in FIG. 2.

FIG. 2 shows a side wall 15 between approximately the forward and the rearward wheel house 11, 12 of the motor vehicle illustrated in FIG. 1, at whose lower end the door sill 10 is fixedly arranged and is fixedly connected with the floor panel 14 by way of the fastening arrangement. In an enlargement, FIG. 3 shows the fastening arrangement according to the detail III in FIG. 2. For reasons of clarity, the door sill covering 13 is not shown in FIGS. 2 and 3.

The door sill 10 has an approximately box-shaped profile formed of several partial shells, which profile will be explained in detail particularly with reference to FIG. 4. At its rearward end, the door sill 10 is bounded by a wheel house panel 17 which extends in the circumferential direction of the wheel house 12 and is situated in the interior. The interior-situated wheel house panel 17 is welded to an adjoining front panel 18 which extends in the longitudinal direction of the vehicle and vertically, and forms the front side of the wheel house 12.

The interior-situated wheel house panel 17 ends in the front at the bottom, while extending approximately vertically in the transverse direction of the vehicle, at the level of the floor panel 14 welded to it or at the level of the underside of the door sill 10. In addition, the wheel house panel 17, is covered by a wheel house panel 19 which is situated on the exterior and extends in the circumferential direction of the wheel house 12, and which, while being adapted to the wheel house panel 17 situated in the interior, is connected with the wheel house panel 17.

The exterior-situated wheel house panel 19 is shown only in a cutaway manner in the upper area of the wheel house 12. It ends in the front on the bottom, while extending approximately vertically in the transverse direction of the vehicle, at the level of the wheel house panel 17 situated in the interior. The exterior wheel house panel 19 is connected with the floor panel 14 or the door sill 10 by the interior wheel house panel 17. A lower longitudinal side 21 of the door sill 10, which extends approximately horizontally in the longitudinal direction of the vehicle, has a downwardly bent welding flange 22 which extends approximately in the vertical direction of the vehicle and which is connected with an edge zone 23 of the floor panel 14 adapted to it and extending laterally in the interior, along a butt joint 24 (FIG. 4), which extends approximately in the vertical direction of the vehicle, by way of a spot-welded connection with a run of spot welds 25.

In the corner area between the door sill 10 and the interior wheel house panel 17 with the floor panel 14, a lug-type tension member 26 is assigned to the fastening arrangement. The tension member 26 is constructed here as a separate angle piece whose shape is more fully illustrated in FIGS. 5a and 5b. It would also be within the scope of the present invention for the tension member 26 to be constructed in one piece with the door sill 10 or with the floor panel 14. The first end of the tension member 26 is fastened by a first leg 27 which, by way of its broad side 28, rests on the outside on a side 29 of the welding flange 22 facing away from the butt joint 24. On its other end, the tension member 26 is fastened in the area of the rearward wheel house 12 by a broad side 31 of its other leg 30, to an adjacent area 32 of the floor panel 14. In the illustrated embodiment, the additional leg 30 extending transversely to the butt joint 24 is connected by its broad side 31 by way of the interior wheel house panel 17 arranged between the tension member 26 and the floor panel 14 with the adjacent area 32 of the floor panel 14.

Figure 5A:
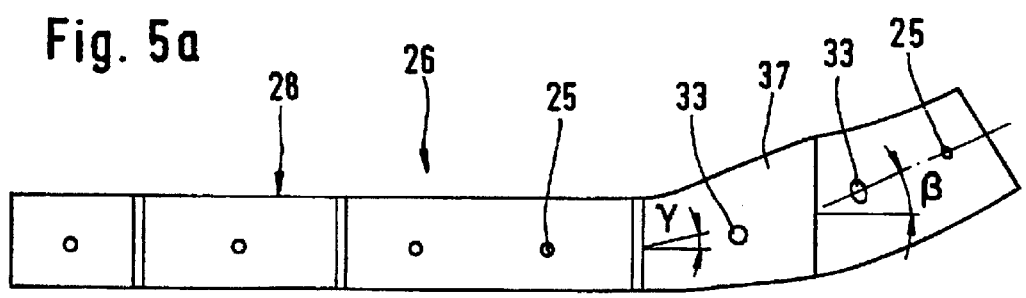
FIG. 5a is a side view of a tension member or lug of the fastening arrangement according to the present invention.
Figure 5B:
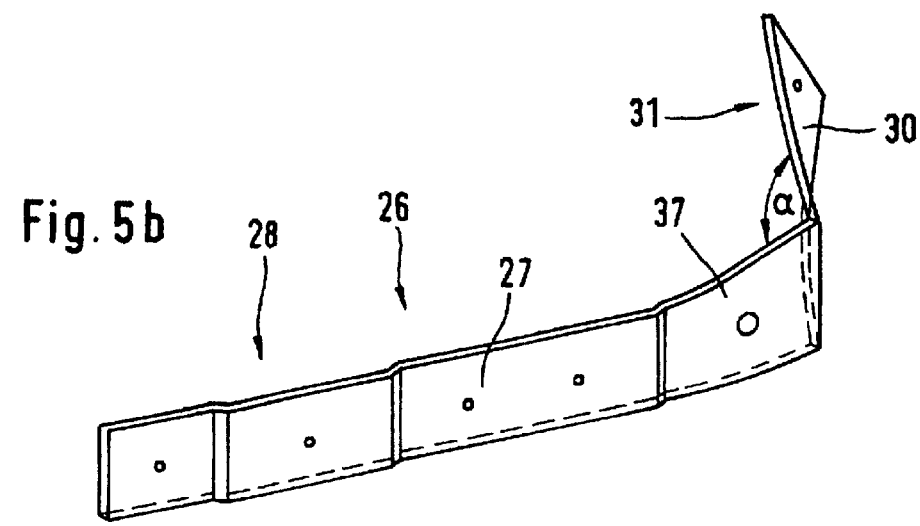

The first and the additional leg 27, 30, as illustrated particularly in FIGS. 5a and 5b, enclose an angle $\alpha$ of approximately 110° as seen in FIG. 5b. The first leg 27 of the tension member 26 extends approximately horizontally in the longitudinal direction of the vehicle and is arranged on the welded flange 22 by means of a spot-welded connection. The additional leg 30, starting from the first leg 27, extends at an angle $\beta$ (FIG. 5a) of approximately 25° diagonally upward and is fastened, preferably also by a spot-welded connection, to the interior wheel house panel 17 and to the floor panel 14.

The exterior wheel house panel 19 is pulled downward approximately to the level of the floor panel 14, and the tension member 26 is fixedly arranged between the interior and the exterior wheel house panel 17, 19. The two wheel house panels 17, 19 with the tension member 26 arranged therebetween can then also be connected with the floor panel 14 by way of a single spot-welded connection.

In another contemplated embodiment, the exterior wheel house panel 19 which is connected to the interior wheel house panel 17 by a welded connection, ends above the tension member 26, so that the tension member 26 is welded only to the interior wheel house panel 17. The first leg 17 fastened to the welding flange 22 of the door sill 10 is preferably fastened to the welding flange 22 by way of the spot-welded connection which connects the welding flange 22 with the adjoining edge zone 23 of the floor panel 14.

The first leg and the additional leg 27, 30 are fastened on the welding flange 22 or on the edge zone 23 of the floor panel 14, additionally to the welded connection, by at least one rivet (e.g., punch-type rivet 33) respectively which penetrates the welding flange 22 and the edge zone 23. The punch-type rivet 33, which fixes the first leg 27 on the welding flange 22, is preferably arranged instead of the rearmost weld spot, which connects the tension member 26 with the welding flange 22 and the edge zone 23, at the rearward end of the door sill 10, to ensure a particularly good connection between the tension member 26 and the welding flange 22 in the event of a crash. By way of the door sill covering 13 as well as by way of an interior wheel housing covering (not shown) and by way of which the wheel house 12 is covered on the interior side with respect to the rear wheel (not shown), the tension member 26 is covered and therefore protected from environmental influences.

Figure 4:
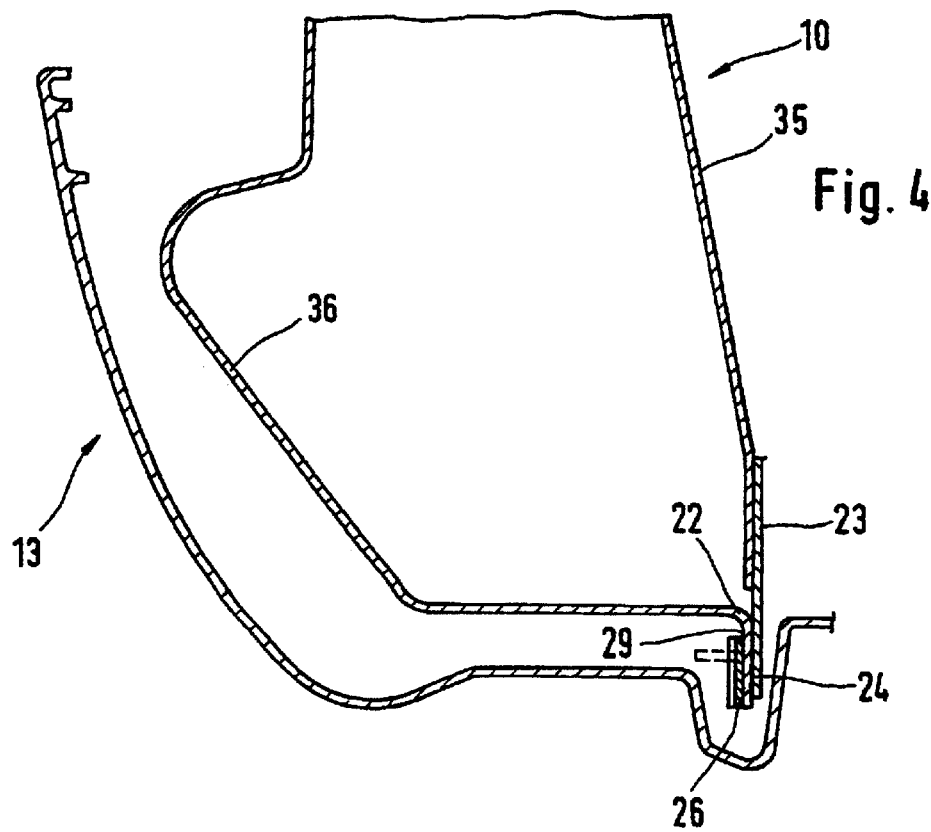
FIG. 4 is a sectional view of the fastening arrangement along line IV—IV in FIG. 3.

FIG. 4 is a sectional view of the fastening arrangement along line IV—IV in FIG. 3. The door sill 10 can be covered on the outside and on the bottom by the door sill covering 13 which is fastened on the door sill 10 by receiving devices. The door sill 10 consists of an inner partial shell 35 and an outer partial shell 36, which bound the side wall 15 in the downward direction. Only the downwardly bent edge zone 23, which extends approximately in the vertical direction of the vehicle, is visible of the floor panel 13 and rests against the interior partial shell 35 and is connected therewith, for example, by a spot-welded connection extending along the entire length of the door sill 10.

As illustrated in FIG. 4, the downwardly bent welding flange 22 is constructed in one piece with the exterior partial shell 36 of the door sill 10. The outer partial shell 36 of the door sill 10 is fixedly connected by the downwardly bent edge zone 23 of the floor panel 14 with the inner partial shell 35 of the door sill 10. The first leg 27 of the tension member 26 is fastened on the outside resting on the side 29 of the welding flange 22 facing away from the butt joint 24. The first leg 27, the welding flange 22 and the edge zone 23 are connected with one another by the spot-welded connection along the butt joint 24 and additionally by the punch-type rivet 33. For achieving even better stability characteristics, as illustrated in FIG. 4, the first leg 27 can be bent at the top. The additional leg 30 can also be bent at the top.

The lug 26 shown in FIGS. 5a and 5b has several projections in the area of the first leg 27. These projections adapt the first leg 27 to the welding flange 22. In order to obtain, in the event of a crash, a particularly stable connection of the door sill 10 and the floor panel 14, a last section 37 of the first leg 27 extends at an angle of approximately 15°, and the additional leg 30 extends at an angle β of approximately 25° with respect to the horizontal line in the upward direction.

In order to achieve a flat contact of the additional leg 30 on the interior wheel house panel 17, this leg 30, as illustrated in FIG. 5b, is bent in a flat manner. The tension member 26 is formed of a steel band. It is also contemplated to use other steel profiles, such as tubes or the like, which are suitable for transmitting larger tension forces. Further, it would also be within the scope of the present invention to use, instead of a steel profile, a plastic profile made of the fiber composite or the like, or an aluminum profile, which the tension member 26 would then have to be arranged on the floor panel 14 and the welding flange 22 by a different connection, e.g., a riveted or screwed connection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fastening arrangement of a door sill on a motor vehicle floor panel, comprising, a welded connection provided between a welding flange on a longitudinal side of the door sill and an edge zone of the floor panel extending laterally next thereto, and being distributed along a length of the door sill, at least one run of spot welds, and a butt joint between the welding flange of the door sill and the opposite edge zone of the floor panel bridged in a rearward length area by a tension member extending in a direction of the door sill and having one end fastened on the door sill and another end adjacent an area of the floor panel.

2. The fastening arrangement according to claim 1, wherein the butt joint extends substantially in a motor vehicle vertical direction.

3. The fastening arrangement according to claim 1, wherein spot-welded connections fasten the one and the other ends of the tension member.

4. The fastening arrangement according to claim 1, wherein the tension member is a separate angle piece having a first leg and a second leg which legs enclose an obtuse angle (α) of between approximately 100 to 150°.

5. The fastening arrangement according to claim 4, wherein the first leg of the tension member is fastened by a broad side thereof resting on a side of the welding flange facing away from the butt joint, and the second leg in an area of a rearward wheel house is fastened by a broad side thereof on an adjacent area of the floor panel.

6. The fastening arrangement according to claim 4, wherein the first leg of the tension member extends approximately horizontally, and the second leg extends, starting from the first leg, diagonally upward.

7. The fastening arrangement according to claim 4, wherein a wheel house panel connects the tension member in the area of the rearward wheel house with the floor panel.

8. The fastening arrangement according to claim 4, wherein the tension member is covered by at least one of a covering of the door sill and the rearward wheel house.

9. The fastening arrangement according to claim 1, wherein the tension member is fastened on the welding flange and on the edge zone of the floor panel by at least one penetrating rivet.

10. The fastening arrangement according to claim 1, wherein the tension member is mirror-symmetrically arranged with respect to a longitudinal motor vehicle center plane on both door sills and respective assigned adjacent areas of the floor panel.

* * * * *